United States Patent

Siesco, Jr.

[11] Patent Number: 5,549,206
[45] Date of Patent: Aug. 27, 1996

[54] NONFERROUS METAL SEPARATOR

[75] Inventor: Leonard E. Siesco, Jr., Fredonia, Wis.

[73] Assignee: Miller Compressing Company, Milwaukee, Wis.

[21] Appl. No.: 347,505

[22] Filed: Nov. 30, 1994

[51] Int. Cl.$^6$ .................................................. B03B 7/00
[52] U.S. Cl. ............................................ 209/17; 209/157
[58] Field of Search ............................. 209/17, 44, 156, 209/157

[56] References Cited

U.S. PATENT DOCUMENTS

| | | |
|---|---|---|
| 1,392,400 | 10/1921 | Chance . |
| 2,139,047 | 12/1938 | Tromp ................................. 209/156 X |
| 2,198,390 | 4/1940 | Olney ................................... 209/156 X |
| 2,203,601 | 6/1940 | Rakowsky et al. . |
| 2,365,734 | 12/1944 | Tromp ................................. 209/156 X |
| 2,590,756 | 3/1952 | Colin et al. ......................... 209/156 X |
| 2,603,352 | 7/1952 | Tromp ................................. 209/156 X |
| 2,612,267 | 9/1952 | Vogel ................................... 209/156 X |
| 2,621,791 | 12/1952 | Bitzer . |
| 2,713,945 | 7/1955 | Fontein . |
| 2,734,629 | 2/1956 | Menzies . |
| 2,946,438 | 7/1960 | Belugou et al. ..................... 209/156 |
| 3,344,918 | 10/1967 | Leonard III ........................ 209/156 X |
| 3,788,465 | 1/1974 | Reimers et al. . |
| 4,155,838 | 5/1979 | Basten et al. . |
| 4,245,553 | 1/1981 | Nakamura ........................... 209/156 X |
| 4,347,124 | 8/1982 | Shimoiizaka et al. . |
| 4,470,901 | 9/1984 | Burgess . |
| 4,858,769 | 8/1989 | DeVries . |
| 5,039,534 | 8/1991 | Adams et al. ...................... 209/156 X |

*Primary Examiner*—D. Glenn Dayoan
*Attorney, Agent, or Firm*—Foley & Lardner

[57] ABSTRACT

An apparatus for separating aluminum scrap material from copper, brass and zinc scrap materials, the apparatus including a hopper having a weir on one side, a first fluid nozzle on the other side of the hopper for directing a stream of water having a specific gravity greater than aluminum over the weir, and a chute located above the fluid nozzle for directing the scrap material onto the stream of water so that the aluminum scrap passes over the weir and the rest of the scrap falls into the hopper.

12 Claims, 2 Drawing Sheets

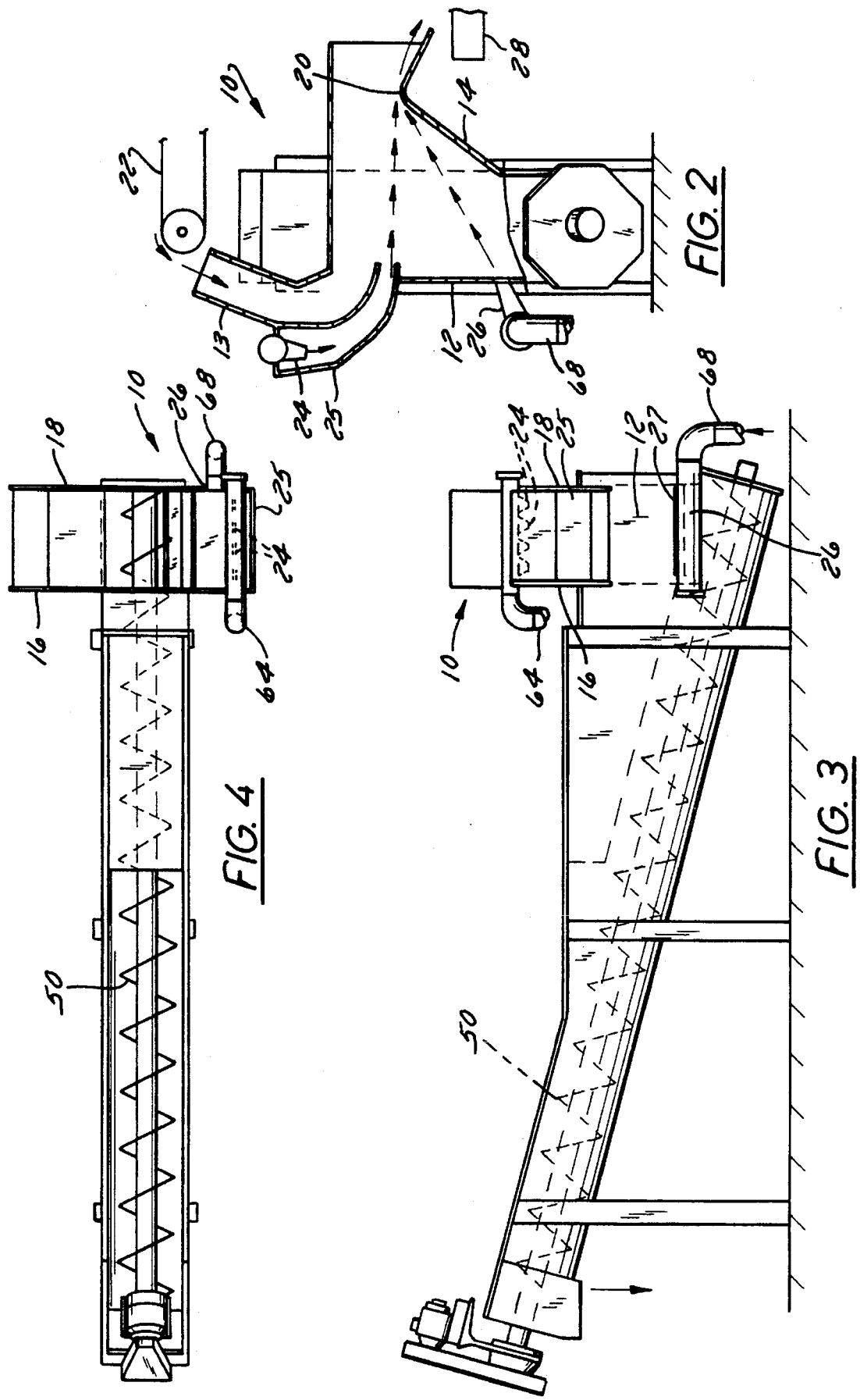

NONFERROUS METAL SEPARATOR

FIELD OF THE INVENTION

The present invention relates to the separation of non-magnetic, low density particles from nonmagnetic high density particles and more particularly to the separation of aluminum particles from brass, copper and/or zinc particles.

BACKGROUND OF THE INVENTION

This invention relates to the separation of nonferrous metals such as aluminum, copper, zinc and brass and more particularly to the separation of aluminum particles from copper, zinc and brass particles. There are a number of known processes that take advantage of the different specific gravity of the materials to affect the separation of aluminum from the copper, zinc and brass. Fundamentally, density is a controlling factor in such gravity separating processes but it is more convenient to use the expression of density in the CGS system known as specific gravity. The metals of high density fall at a greater rate through a given fluid medium than those of lower density. A small dense particle may fall at the same rate as a larger but less dense particle, therefore attempts heretofore made to separate ores on the basis solely of their falling velocity in a given medium have not produced satisfactory results because of the many sizes of particles in any given material.

SUMMARY OF THE PRESENT INVENTION

According to the present invention when it is desired to separate aluminum particles having a specific gravity of 2.7 from copper, zinc and/or brass particles which have much higher specific gravities, magnetite and/or ferro silicone powder is added to water to raise the specific gravity of the water above the specific gravity of the aluminum. The material added is in a ratio of 3 to 1 of magnetite powder to ferro silicone powder which is added to water to raise the specific gravity of the medium from 3.0 to 3.5. The important point is that the specific gravity of the separating medium once established, must be kept constant in the separating zone.

According to the present invention nonmagnetic particles are carried on a conveyor and dropped off the end of the conveyor into a chute material on the top of a hopper having a weir on one side. A fluid medium having a specific gravity greater than the specific gravity of the aluminum particles is directed over the weir. The particles having a specific gravity less than the specific gravity of the fluid medium are carried over the weir and the particles having a greater specific gravity fall into the hopper. The specific gravity of the medium once established is kept constant in the separating zone by imparting a very high pressure flow of the medium through the separating zone sufficient to prevent settling of any of the aluminum particles. A second high pressure flow of the separating medium is directed upward through the flow of the first medium at or in close proximity to the weir over which the low specific gravity particles are carried by the fluid medium while the high specific gravity material falls through the medium onto a conveyor. With this arrangement the recovery rate of aluminum particles has been increased from approximately 50% recovery to approximately 75% recovery.

Other principal features and advantages of the invention will become apparent to those skilled in the art upon review of the following drawings, the detailed description and the appended claims.

BRIEF DESCRIPTION OF THE DRAWINGS

FIG. 2 is an end view partly in section of the hopper assembly showing the flow paths of the separating medium;

FIG. 3 is a side view of the hopper assembly shown mounted on the end of the conveyor assembly for discharging the high density particles from the hopper; and FIG. 4 is a top view of the hopper and conveyor assembly.

Figure 1:
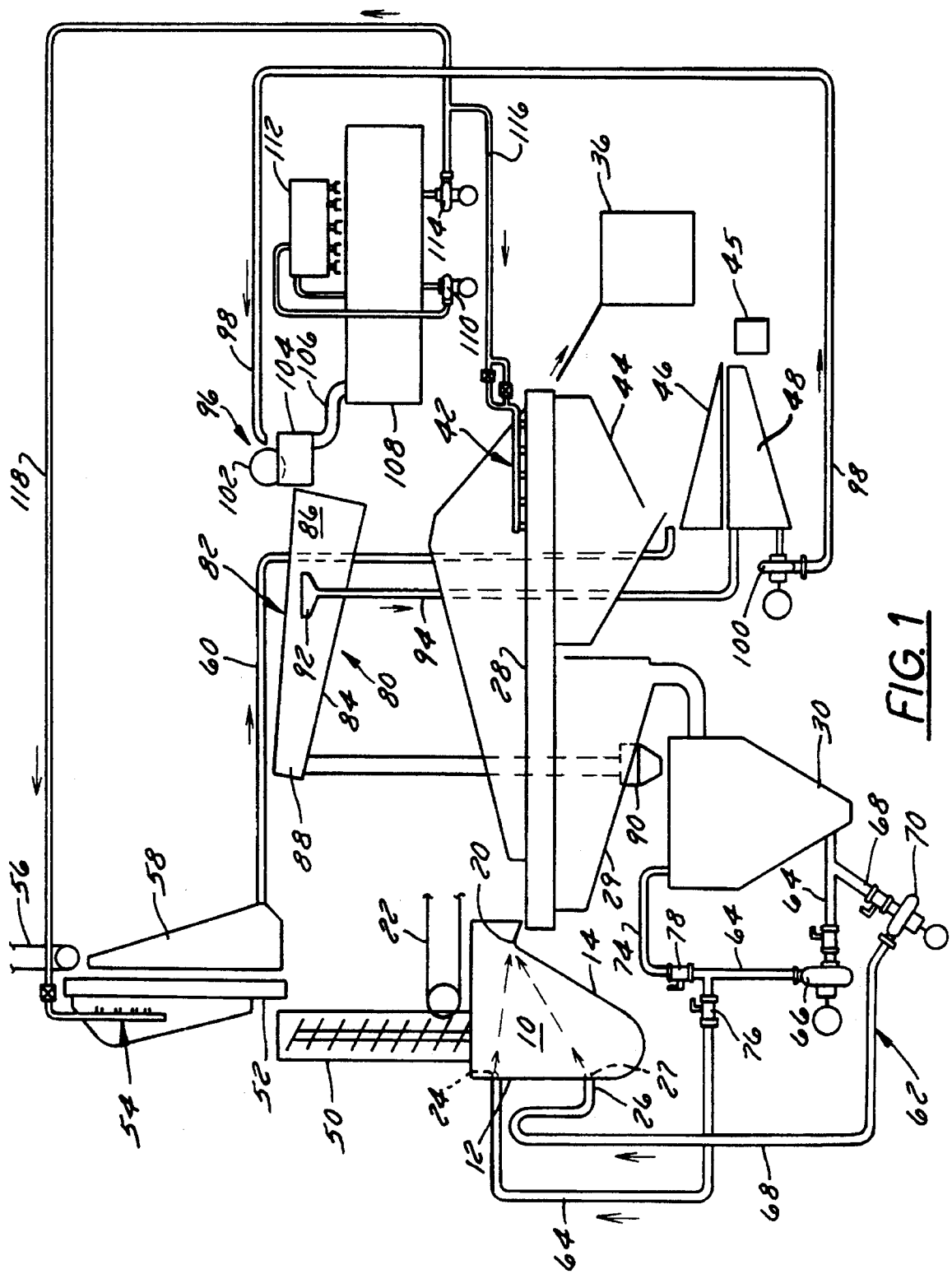
FIG. 1 is a schematic diagram of the aluminum separator system.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

The present invention relates to an apparatus for separating aluminum particles from copper, brass and zinc particles as shown in the drawings. The apparatus generally includes a hopper 10 having a front wall 12, a back wall 14 and a pair of end walls 16 and 18. The back wall 14 is angled upwardly and outwardly from the front wall 12. The upper edge of the back wall 14 forms a weir 20 which terminates at a distance downwardly from the upper edge of the front wall and side walls. An infeed conveyor 22 is positioned a spaced distance above the hopper for feeding the nonferrous materials, i.e. aluminum, zinc, copper and brass particles directly into a chute 13 located on the top of the hopper 10. The aluminum particles are separated from the zinc, copper and brass particles by directing a stream of heavy water having a specific gravity of 3.0 to 3.5 over the weir 20.

In this regard a set of four nozzles 24 are mounted on the upper end of a chute 25 for directing a high pressure fluid stream across the top hopper 10. The stream of water flows across the top of the weir 20 on side wall 14. The nonferrous materials are discharged from the chute 13 onto the stream of heavy water at approximately the same flow rate as the water. The heavy water carries the aluminum particles over the weir 20. The high density particles pass through the stream of water into the bottom of hopper 10. A second nozzle 26 in the form of a slot 27 is provided in the wall 12 below the nozzle 24 for directing a second high pressure fluid stream upwardly into engagement with the falling particles at or in close proximity to the weir 20.

The aluminum particles which pass over the weir 20 are accumulated on a shaker screen 28 and separated from the fluid stream by the screen 28. The heavy water passes through the screen 28 into a hopper 29 and is directed into a heavy medium sump 30. The aluminum particles are carried to the other end of the screen 28, and discharged into a hopper 36 at the end of the shaker screen 28. The aluminum particles are rinsed by a sprinkler system 42 located at the end of the shaker screen 28. The water falls into a hopper 44 passes through a vibrating type lint screen 46 into a holding tank 48. Any lint left on the lint screen is vibrated into a lint box 45.

The heavy particles of brass, copper and zinc fall into the bottom of the hopper 10 and are transferred by a conveyor 50 up to a second shaker screen 52, sprayed with water by spray nozzles 54 and dropped onto a discharge conveyor 56. The water from nozzles 54 falls into a hopper 58, passes through a pipe 60 and the lint screen 46 into the holding tank 48.

In order to more efficiently separate the low specific gravity materials from the high specific gravity materials a heavy fluid medium having a specific gravity of 3.0 to 3.5 is used. The fluid medium is formed by adding ferro silicone and magnetite powder at a ratio of 1.0 to 3.0 to the water. The medium having a specific gravity of 3.0 to 3.5 which is higher than the specific gravity of aluminum, 2.7, but lower than the specific gravity of zinc, 6.9, copper, 9.0, and brass, 8.5.

A closed heavy medium loop 62 is formed to maintain the specific gravity of the fluid medium. In this regard the heavy medium is maintained in the sump 30 which is connected through a pump 66 to the upper nozzles 24 by a tube 64. A second pump 70 connects the sump 30 to the lower nozzle 26 by a tube 68. A mixing circuit is provided for periodically agitating the fluid medium in sump 30. In this regard a pipe 74 connects tube 64 to sump 30. A valve 76 is provided in tube 64 and a bypass valve 78 is provided in pipe 74. The fluid medium can then be agitated by closing valve 76 and opening bypass valve 78 to circulate the fluid medium before start up.

A densifier 80 is provided in the circuit to maintain the specific gravity of the fluid. The densifier is in the form of a hopper 82 having a slanted bottom wall 84, enclosed by side walls 86 and end walls 88. A discharge nozzle 90 having a demagnetizing coil is connected to the upper end of the bottom wall 84.

An overflow funnel 92 is mounted in the hopper 82 on the end of a pipe 94 which is connected to the holding tank 48. The tank 48 is connected to a conventional magnetic drum assembly 96 by a pipe 98. A pump 100 is provided in pipe 98 for circulating the water into the magnetic drum assembly 96. The magnetic drum assembly 96 includes a hopper 104 having a magnetic drum 102 positioned at the end of the pipe 98. Water from the holding tank 48 is pumped through the pipe 98 by means of a pump 100 into the magnetic drum assembly 96. The ferro silicone fluid is separated from the water by means of the magnetic drum 102 which attracts the ferro silicone fluid and releases it into hopper 82. The fluid is demagnetized as it passes through the demagnetizing coil in nozzle 90. The water which has been separated from the silicone fluid passes from a hopper 104 through a tube 106 into a settling tank 108. The water in tank 108 is circulated by a pump 110 through a filter tank 112 wherein the water passes through filter bags (not shown). The clean water is recirculated to the spray nozzles 54 by pump 114 through pipes 116 and 118.

Thus, it should be apparent that there has been provided in accordance with the present invention a nonferrous metal separator that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An apparatus for separating low specific gravity aluminum particles from high specific gravity zinc, copper and brass particles comprising:

a hopper having side walls and end walls, a weir formed across the top of one of the walls, a first fluid nozzle assembly mounted on the top of the wall opposite said weir for directing a high pressure fluid medium over the weir, the fluid medium having a specific gravity greater than the aluminum particles and less than zinc, copper and brass particles; and an infeed conveyor positioned above the hopper for directing a flow of aluminum, zinc, copper and brass particles into said high pressure fluid medium, whereby the high pressure fluid medium carries the aluminum particles over the weir and the zinc, copper and brass particles pass through the high pressure fluid medium into the hopper.

2. The apparatus according to claim 1 including a chute mounted on said hopper below said conveyor for directing the particles toward the weir.

3. The apparatus according to claim 2 wherein said particles are directed onto the fluid medium at approximately the same rate of flow as the fluid medium.

4. The apparatus according to claim 3 including a second fluid nozzle assembly mounted on the bottom of said opposite wall for directing a second fluid medium over said weir.

5. The apparatus according to claim 4 including means located downstream from the hopper for separating the low specific gravity material from said fluid medium.

6. The apparatus according to claim 1 including a closed system for recirculating the fluid medium back to the first nozzle assembly.

7. The apparatus according to claim 6 including a second fluid nozzle assembly mounted on the opposite wall below the first nozzle and being connected to said closed system for directing a second stream of the fluid medium over the weir.

8. An apparatus for separating aluminum particles from zinc, copper and brass particles, the apparatus comprising:

a hopper having a weir on one side, a first nozzle assembly mounted on the hopper at the same level as said weir, means for directing a high pressure fluid medium through said first nozzle assembly and over said weir, said high pressure fluid medium having a specific gravity greater than said aluminum particles and means for introducing a stream of aluminum, zinc, copper and brass particles into said fluid medium wherein said fluid medium will carry said aluminum particles over said weir and said zinc, copper and brass particles will pass through the fluid medium into the hopper.

9. The apparatus according to claim 8 wherein said fluid medium and said aluminum is introduced into the fluid medium at the same rate of flow.

10. The apparatus according to claim 9 wherein said nonferrous material includes aluminum, copper, zinc and brass and said fluid medium has a specific gravity greater than aluminum.

11. The apparatus according to claim 8 including a second nozzle assembly mounted in said hopper in a spaced relation to said weir and being located below said first nozzle for directing a second fluid medium into said first fluid medium in close proximity to said weir.

12. The apparatus according to claim 8 including means for recycling the fluid medium from both the high and low specific gravity nonferrous materials.

\* \* \* \* \*